United States Patent [19]
Michalzik

[11] Patent Number: 5,960,332
[45] Date of Patent: Sep. 28, 1999

[54] HANDSET HOUSING FOR RADIO TELEPHONE SYSTEM HAVING LOCKING AND BLOCKING MEMBER

[75] Inventor: Dirk Michalzik, Gladbeck, Germany

[73] Assignee: Nokia Mobile Phones Limited, Espoo, Finland

[21] Appl. No.: 08/852,098

[22] Filed: May 6, 1997

[30] Foreign Application Priority Data

May 10, 1996 [DE] Germany .......................... 196 18 981

[51] Int. Cl.[6] .................................................. H04Q 7/20
[52] U.S. Cl. .......................... 455/90; 455/550; 455/575
[58] Field of Search ..................................... 455/550, 575, 455/90, 351, 348, 349; 379/433, 440, 445

[56] References Cited

U.S. PATENT DOCUMENTS

| | | | |
|---|---|---|---|
| 4,445,008 | 4/1984 | Rocca et al. | 455/349 |
| 4,658,439 | 4/1987 | Danielsen et al. | 455/348 |
| 4,945,633 | 8/1990 | Hakanen et al. | 29/825 |
| 5,036,432 | 7/1991 | Uronen et al. | 361/422 |
| 5,045,973 | 9/1991 | Saarela et al. | 361/395 |
| 5,241,592 | 8/1993 | Carlson et al. | 379/433 |
| 5,613,237 | 3/1997 | Bent et al. | 455/351 |
| 5,722,055 | 2/1998 | Kobayashi et al. | 455/351 |

FOREIGN PATENT DOCUMENTS

| | | |
|---|---|---|
| 2806744 A1 | 8/1979 | Germany . |
| 29515644 U1 | 1/1996 | Germany . |

*Primary Examiner*—Edward F. Urban
*Assistant Examiner*—Tilahun Gesesse
*Attorney, Agent, or Firm*—Perman & Green, LLP

[57] ABSTRACT

The invention relates to a handset for a radio telephone system, having a front housing shell (2) and a rear housing shell (1) which can be connected thereto. The handset has in its interior a locking device (22, 23) which, in a locking position, locks the housing shells (1, 2) to one another and, in an unlocking position, releases the locking. In addition, the handset also contains in its interior a blocking device (30, 32) which prevents the locking device changing over automatically from the locking position into the unlocking position. Activation of the blocking device (30, 32) is possible only in a way which is as a rule difficult to discover.

16 Claims, 6 Drawing Sheets

HANDSET HOUSING FOR RADIO TELEPHONE SYSTEM HAVING LOCKING AND BLOCKING MEMBER

The invention relates to a handset for a radio telephone system such as may be found in a mobile telelphone or a cordless telephone.

However, in the most general case, the term handset also covers a handset unit of a two-component radio telephone, for example a car telephone, which comprises a handset unit and a control device.

Usually, a handset of the type mentioned above comprises a front housing shell and a rear housing shell which are detachably connected to one another, usually by means of screws. These can be easily undone so that the handset can be opened even by non-professionals, which can lead to damage and possibly to operational faults.

The invention is based on the object of ensuring in a handset of the type mentioned at the beginning that it can no longer readily be opened by non-professionals, but can be dismantled in a quick and uncomplicated way by a person skilled in the art.

A handset which is provided for a radio telephone system and is in accordance with the invention is characterized in that it has in its interior a locking device which, in a locking position, locks the housing shells to one another and, in an unlocking position, releases the locking, and in that it also contains in its interior a blocking device which prevents the locking device changing over automatically from the locking position into the unlocking position.

For a non-professional, the locking device and the blocking device are thus inaccessible, since they are both located in the interior of the handset. The handset can therefore be opened virtually only by professional personnel. It is only such personnel who know the possible ways of actuating the blocking device in such a way that it allows the locking device to change over from the locking position into the unlocking position, so that the housing shells can be separated from one another. The operational reliability and the service life of the handset can thus be decisively improved.

The locking device and the blocking device can be arranged spatially separated from one another. However, it is also possible to combine at least parts of the locking device and of the blocking device to form a common element. This element could then have both a locking function and a blocking function.

The locking device is intended to be understood as a device which, when the two housing shells are connected, permits relative displacement in one direction of the locking elements associated with the said connection, that is to say a displacement between the locking position and unlocking position, and otherwise prevents a relative displacement of the locking elements in a direction perpendicular thereto when the said locking elements have reached the locking position.

The blocking device then serves to block the relative displacement of the locking elements in the remaining single direction.

According to an advantageous development of the invention, the blocking device can be actuated through an opening which is located in an outer wall of one of the housing shells, the opening being closed off by a removable outer wall element of this housing shell. In this context, the outer wall element may also be located in the opening.

For the person skilled in the art, a simple way of actuating the blocking device is thus available, while it is not so easy for the non-professional to discover this way, especially if the outer wall element can be seen only with difficulty, as a result for example of being covered by a type plate or as a result of a continuous structuring of the wall of the housing shell. On the other hand, even when the outer wall element is removed, it can be ensured that means for actuating the blocking device can be found only with difficulty, so that, even in this unfavourable case, the probability of a non-professional discovering this means is still small.

According to one refinement of the invention, projections which are borne by one of the housing shells and hooks which are borne by the other housing shell and which can be displaced parallel to a connection plane of the housing shells are associated with the locking device. The direction of displacement can be selected here as desired but will preferably be in the longitudinal direction of the handset. When the locking position is reached, the projections are pushed into the hooks. By means of the blocking device, any further relative displacement between the projections and hooks parallel to the connection plane of the housing shells is then blocked, so that it is then no longer possible to separate the housing shells from one another.

According to another advantageous refinement of the invention, when the housing shells rest one on the other, they can be displaced parallel to one another, with the projections and the hooks being attached securely to them. For example, the projections and hooks may be integrally connected to the respective housing shells. If the housing shells are composed of plastic, this then also applies to the projections and hooks. The locking device can thus be constructed in a space-saving way and therefore manufactured cost-effectively.

According to yet another refinement of the invention, the blocking device contains at least one latch element which is borne by one of the housing shells and engages behind one edge of the other housing shell when the locking device is in the locking position. Depending on the design of the handset, such a latch element can also be arranged at a suitable point. However, it has proven advantageous to provide separate latch elements in the path of the projections or hooks in each case, for example on the two longitudinal sides of the handset if the projections and hooks are also arranged along these longitudinal sides. This leads to more reliable blocking of the locking position.

The latch element may be constructed for example as a latch arm which is pivotably mounted on the housing shell. If there are two latch arms, they may be connected to one another via a common bar. Each of the latch arms has here on its free side a latch which, when the locking device is in the locking position, engages behind a corresponding edge of the other housing shell.

Latch arms and bars may also be composed of plastic, so that no metal parts are required for the locking device and the blocking device. This enables the handset to be recycled better.

In one development of the invention, the latch element may be coupled to a tension element which is located in the region of the opening. When there are two latch elements, the tension element could also be coupled to the bar which connects the latch elements. By means of this tension element, the latch elements, that is to say the blocking device, can thus be actuated, in order to position the tension element better, its free end can also be guided in a guide means. The tension element itself can be provided at its free end with, for example, a slot into which a pointed object, for example a screwdriver, can be inserted in order to move the tension element in its longitudinal direction.

According to one feature of the invention, the tension element is covered by the outer wall element located in the opening. The outer wall element can be positioned here in such a way that in its specified position it presses down the tension element and thus presses down the latch element behind the edge when the locking device is in the locking position. There is thus no need for a separate mechanism with which, for example, the latch element is prestressed in the direction of the edge. This simplifies the design of the blocking device.

The outer wall element can be displaced in its plane between two positions and cover the tension element in each position, so that even in the various displacement positions of the outer wall element it is not as readily accessible. The tension element becomes accessible only when the outer wall element is completely removed, which requires however further measures. The tension element is thus largely protected against unauthorized access. A so-called SIM card, for example, of the handset, which card is also located in the opening or below it, can be covered by the outer wall element.

According to another exemplary embodiment of the invention, at least two locking rods which each bear projections or hooks and which can be displaced parallel to a connection plane of the housing shells and are mounted on one of the housing shells, as well as hooks or projections on the other housing shell, are associated with the locking device. In order to form the blocking device, one end of the respective locking rods is held here so as to be displaceable in a clamping fashion in a holder on one of the housing shells.

The locking rods are preferably located on the two longitudinal sides of the handset and extend in its longitudinal direction. They can themselves be displaced in their longitudinal direction. In order to displace the locking rods, they may each be provided, in the region of their other end, with an extension which projects into the battery space of the handset. In this context, the respective extension can come to rest underneath batteries located in the battery space, in order to protect the said extension against incorrect activation. The locking rods can also be connected to one another, for example via the aforesaid extensions, so that only one displacement operation is required.

If, after the batteries have been removed, the respective extension is displaced in order to be able to separate the housing shells from one another, a comparatively large amount of force must be applied for this displacement in order to overcome the effect of the blocking device. Only then is displacement requiring less force possible, in order to move the locking device from the locking position into the unlocking position. By selecting a larger clamping force of the blocking device, it is thus ensured that even if a non-professional were to discover the extensions after opening the battery space, he would not readily be able to unlock the housing shells.

If the two locking rods are connected to one another via the extensions, a further locking rod for locking the housing shells in the region of their end sides may extend starting for example from the connecting region of the extensions, which leads to an even more reliable connection between the two housing shells. This further locking rod is preferably located on the central axis of the handset and extends beneath the battery compartment in the longitudinal direction in order to lock the housing shells in the region of the lower end side, for example.

BRIEF DESCRIPTION OF THE DRAWINGS

Exemplary embodiments of the invention are explained below in more detail with reference to the drawing, in which:

FIG. 1b shows a plan view of the rear side of the mobile telephone according to FIG. 1a;

DETAILED DESCRIPTION OF THE PREFERRED EMBODIMENT

Figure 1A:
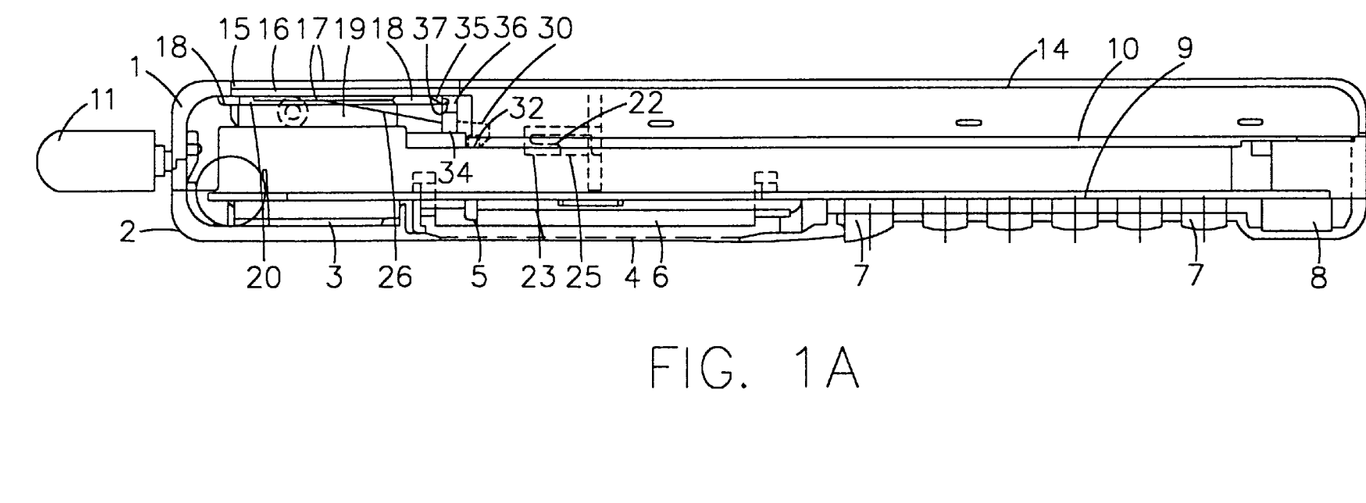
FIG. 1a shows a longitudinal section through a mobile telephone, perpendicularly to its main plane, the said mobile telephone being equipped with a locking device and a blocking device according to a first exemplary embodiment of the invention.
Figure 1B:
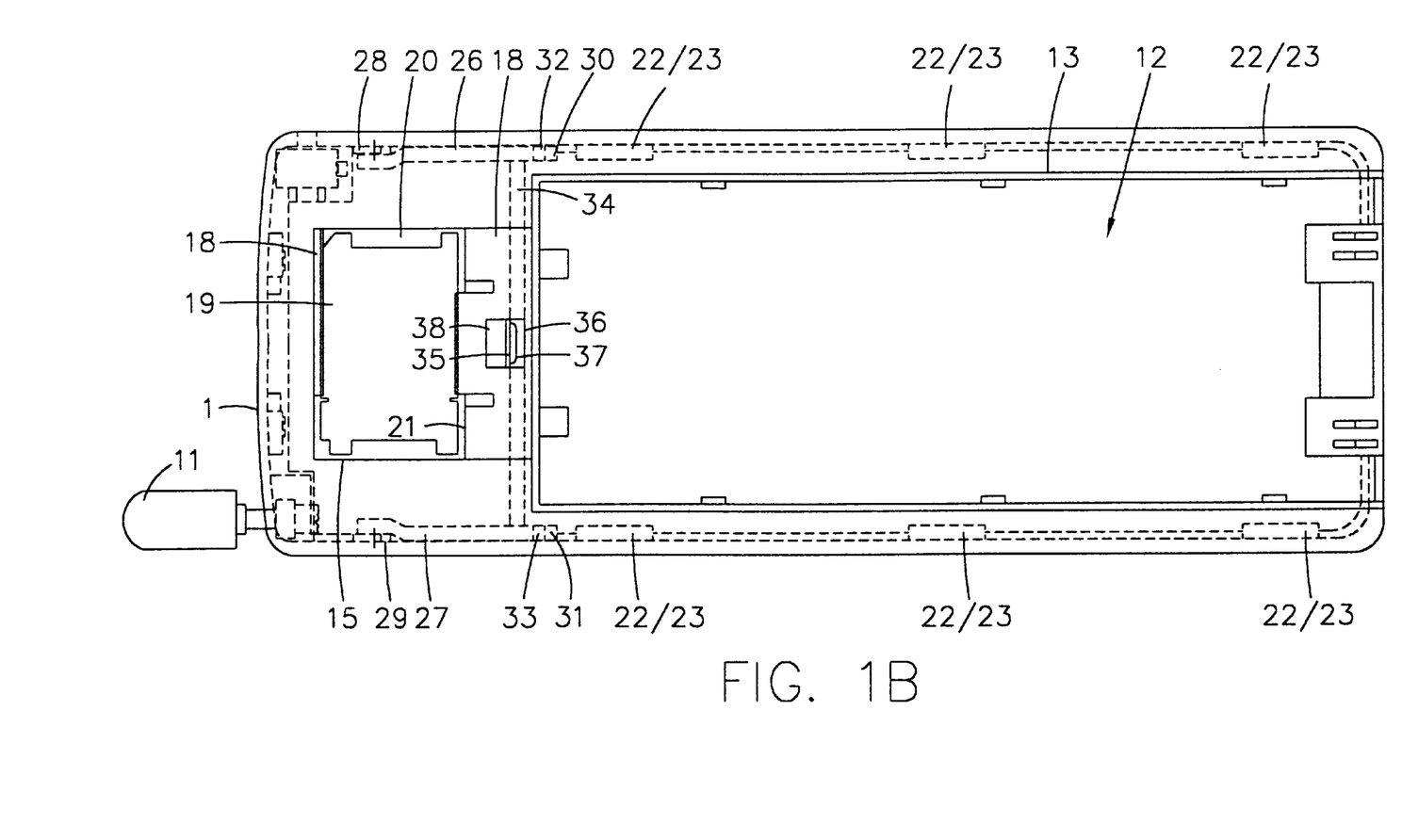

The mobile telephone which is constructed as a handset and is in accordance with FIGS. 1a and 1b is associated with a radio telephone system in which mobile telephones can communicate with one another via a fixed base station. Such a mobile telephone can also be referred to as a mobile.

The handset according to FIGS. 1a and 1b is composed of a rear housing shell 1 and a front housing shell 2. These are, as it were, half shells which are connected to one another in order to form the handset. They can also be detached from one another again, as is described below. The front housing shell 2 has a loudspeaker 3, a display 6 which is arranged behind a window 4 in a frame 5, a plurality of keys 7 and a microphone 8. All the units 3 to 8 are located on a main printed circuit board 9. The latter is attached in a suitable way between the front housing shell 2 and the rear housing shell 1. All the electric components on the printed circuit board 9 are screened by a screen plate 10. The receiving and transmitting devices (not illustrated) on the printed circuit board 9 are connected to an antenna 11 via a line (not illustrated either).

The rear housing shell 1 serves to form a battery space 12 at the lower end of the handset, in which battery space a battery pack 14 for operating the handset can be accommodated. The battery space 12 is accessible via an opening 13 when the housing shells 1 and 2 are connected to one another and is filled by the battery pack 14 so as to be aligned with the outer skin of the handset. The battery pack 14 can be seen in FIG. 1a and is omitted in FIG. 1b for the sake of clarity.

At the upper end, located in the vicinity of the antenna 11, of the rear housing shell 1 there is at its rear side, as it were as an extension of the outer wall of the battery pack 14, an opening 15 which is closed off by an outer wall element 16. The latter can be seen in FIG. 1a. The outer wall element 16 is normally aligned with the outer wall of the battery pack 14 and forms, together therewith, the rear wall of the rear housing shell 1. Directly underneath the outer wall element 16, parallel thereto, is a guide rail 17 by means of which the outer wall element 16 is guided, and can be displaced, in the longitudinal direction of the handset. On the one hand, the opening 15 can be closed off with the outer wall element 16, as is shown in FIG. 1a, while, on the other hand, the outer wall element 16 can be displaced in the direction of the lower end of the handset, that is to say in the direction of the microphone, the battery pack 14 having, however, to be removed previously. Here, the displacement of the outer wall element 16 in this direction is, however, limited as is explained below. The rear housing shell 1 and the guide rail 7 may be integrally connected to one another, for example.

Below the opening 15, the rear housing shell 1 holds a support 18 for a control card holder 19 which is accessible through the opening 15. The support 18 too can also be integrally connected to the rear housing shell 1. The control card holder 19 can also be one which is used to hold a so-called SIM card. This control card holder 19 comes to rest, as it were, in a rear recess 20 of the support 18. In the operating state, the outer wall element 16, the guide rail 17 and the control card holder 19 lie parallel to one another. In order to open the control card holder 19, the outer wall element 16 is displaced in the direction of the lower end of the handset until the upper end side of the outer wall element 16 is aligned with the lower edge 21 of the recess 20. The control card holder 19 can now be opened in order to insert or remove a control card. Here, the position of the outer wall element 16 is fixed by latch elements (not illustrated). The outer wall element 16 can thus not slide completely off the support 18 in this operational position.

According to the invention, when the rear housing shell 1 and the front housing shell 2 rest one on the other with their surfaces which point inward they can be displaced in parallel, at least in certain areas, specifically preferably in the longitudinal direction of the handset. In order to produce a mechanically secure connection between the rear housing shell 1 and the front housing shell 2, in the present case the front housing shell 2 is provided with projections 22, a plurality of which are arranged lying one next to the other in the longitudinal direction of the handset. The projections 22 are located on the opposite side faces of the front housing shell 2 and protrude inwards from them. They may be composed of plastic and may be integrally connected to the front housing shell 2. Only one of these projections 22 can be seen in FIG. 1a.

On the other hand, on the rear housing shell 1 there are hooks 23 which are provided for the respective projections 22 and are also arranged on the opposite inner sides of the rear housing shell 1 and protrude inwards therefrom. These hooks 23 can also, like the rear housing shell 1, be produced from plastic and integrally connected to the said housing shell 1. The hooks 23 each have a projection receptacle region 24 which extends in the longitudinal direction of the handset and which finally merges into a mouth 25 which opens in the direction of the front housing shell 2. If the housing shells 1 and 2 are fitted one on top of the other with their inner sides, the projections 22 are initially guided into the mouths 25 until the housing shells 1 and 2 come to rest one on the other. Then, the housing shells 1 and 2 are displaced parallel to one another in the longitudinal direction, so that the projections 22 now slide into the respective projection receptacle regions 24 of the hooks 23. When they then abut, viewed in the displacement direction, the hooks 23, the housing shells 1 and 2 have reached their end position in which the end sides of the housing shells 1 and 2 are aligned with one another. They can then no longer be separated from one another as a result of the fact that they are moved perpendicularly to their connection plane. In order to prevent renewed relative displacement of the housing shells 1 and 2 in their longitudinal direction, according to the invention a blocking device is provided whose design is described below. Firstly, however, it is to be noted that FIG. 1b shows a total of six projection/hook combinations 22, 23. Three of these are each located at the same distance from one another on the respective inner sides of the housing shells 1 and 2.

As already mentioned above, the blocking device serves to prevent a relative displacement of the housing shells 1 and 2 in their longitudinal direction when the projections 22 have been inserted into the projection receptacle regions 24 of the hooks 23.

The blocking device comprises, in the present case, two latch arms 26 and 27, one of which is located in each case on one of the sides of the rear housing shell 1. There its end which points towards the antenna 11 is pivotably coupled in each case to the inner side of the rear housing shell 1. Bearings 28 and 29 are used for this purpose. That end of each latch arm which points away from the antenna 11 is integrally connected to a latch 30, 31. This latch points in the direction of the front housing shell 2. When the latch arms 26, 27 are pivoted furthest away from the rear housing shell 1, the latches 30, 31 engage behind an edge 32, 33 which is provided in each case on the front housing shell 2 and is located on the inner side of the front housing shell 2 and may be formed for example by means of a web or a recess. In this way, the locking position of the locking device is fixed, so that the housing shells 1 and 2 can no longer be detached from one another. Expressed more precisely, the hooks 23 in FIGS. 1a and 1b prevent the projections from being displaced to the left, while the latch arms prevent a displacement of the edges 32, 33 to the right. Separation of the housing shells 1 and 2 perpendicularly from one another is likewise prevented by the projection/hook combination 22, 23, that is to say by the locking effect of the locking device.

Both latch arms 26, 27 are connected to one another via a bar 34 which extends transversely with respect to the handset and comes to rest underneath that region of the carrier 18 which is furthest from the antenna 11. In this region, the support 18 has a support opening 35 into which a rod-shaped tension element 36 extends, the said tension element 36 being coupled to the bar 34. This tension element 36 is aligned with the upper surface of the support 18 and has a lateral indent 37. In order to make this lateral indent 37 accessible, a slope 38 is provided at the corresponding edge of the support opening 35.

If the blocking device is to release the locking device, and if the latch arms 26 and 27 are therefore to be disengaged from the edges 32 and 33, this is achieved by pulling the tension element 36 out of the support opening 35. In order to make this procedure easier, it is possible to engage a screwdriver or another sharp object in the lateral indent 37. Owing to the slope 38, the said indent 37 is accessible when the latch arms 26, 27 are still engaging behind the edges 32, 33.

However, in order to be able to pull the tension element 36 out of the support opening 35, it is necessary to have previously withdrawn the outer wall elements 16 completely. For this purpose, the battery pack 14 must also be removed, as explained at the beginning. Only then can the blocking device be moved into an operational position in which it permits the locking device to be displaced from the locking position into the unlocking position. If the locking device is located in the locking position, the latch arms 26, 27 are moved into engagement with the edges 32, 33 by virtue of the fact that the tension element 36 is pressed downwards by means of the outer wall element 16. Particular prestressing means for the latch arms 26, 27 are thus not necessary.

FIGS. 2a to 2d show once more in detail the procedures when dismantling the handset and when separating the housing shells 1 and 2 from one another. Here, for the sake of clarity, the outer wall element 16, the guide rail 17 and also the battery pack 14 have been omitted. In addition, elements which are identical to those in FIGS. 1a and 1b have been provided with the same reference symbols and are not described again.

Figure 2A:
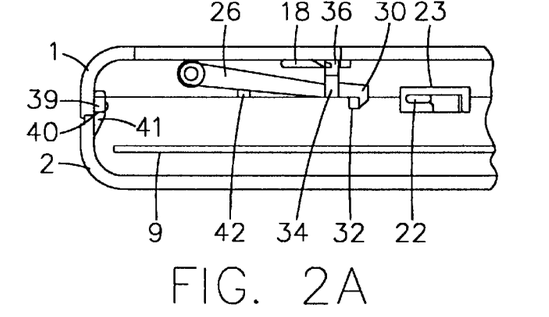
FIGS. 2a to 2d show longitudinal sections corresponding to FIG. 1a with a different displacement position of the housing shells which are associated with the mobile telephone.

In FIG. 2a, the locking device is in the locking position, the projections 22 being therefore completely inserted into the hooks 23. The blocking device is located in the blocking position, so that the latch 30 engages behind the edge 32 or the extension. The upper end of the tension element 36 is aligned with the upper surface of the support 18. For the sake of clarity the latter is represented only partially. In order also to achieve end-sided locking of the housing shells 1 and 2, a plurality of pairs of projections 39, and openings 40 which receive the latter, may be provided here. The projections then point inwards and are located on the inner housing shell 1, while the openings 40 are located in an extension 41 on the inside of the housing shell 2. This can be seen best in FIG. 2d.

Figure 2B:
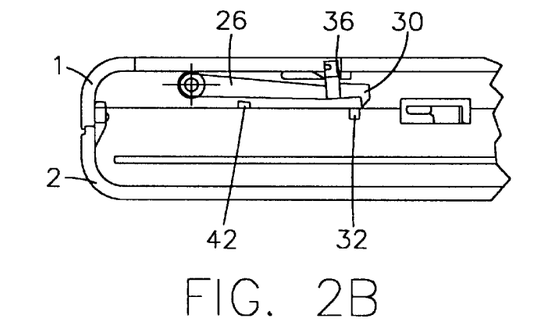
Figure 2C:
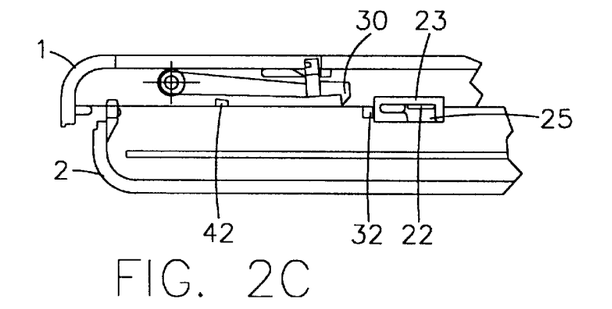

In FIG. 2b, the blocking position of the blocking device is released, specifically by raising the tension element 36. The latch 30 and edge 32 thus disengage. Now, in accordance with FIG. 2c, the housing shells 1 and 2 can be displaced relative to one another in the longitudinal direction so that, in FIG. 2c, the latch 30 moves away to the left over the edge 32. At the same time, the projection 22 is freed and comes to rest in the region of the mouth 25. The projection 39 is also moved out of the opening 40.

Figure 2D:
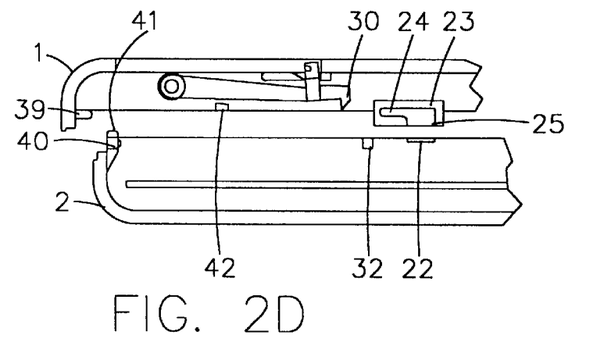

Finally, in accordance with FIG. 2d, the rear housing shell 1 can now be removed vertically from the front housing shell 2. The handset is now opened. In order to close it again, the procedures are carried out in the reverse order.

In order to prevent the latch arms 26, 27 from being pivoted too far out of the rear housing shell 1, the latter may be provided with appropriate stops 42. Moreover, the lower side of the latch 30 may be bevelled so that, in the present case, when the projections 22 enter the projection receptacle region 24 the said side can slide away over the extension 32 which forms the edge.

FIGS. 3a to 3h show a second exemplary embodiment of the invention. They are illustrated in simplified form insofar as they show only the side wall regions of the rear and front housing shells. Here, reference is made only to the design of one side wall of the hand set, since the design of the other side wall of the hand set is symmetrical thereto.

Figure 3A:
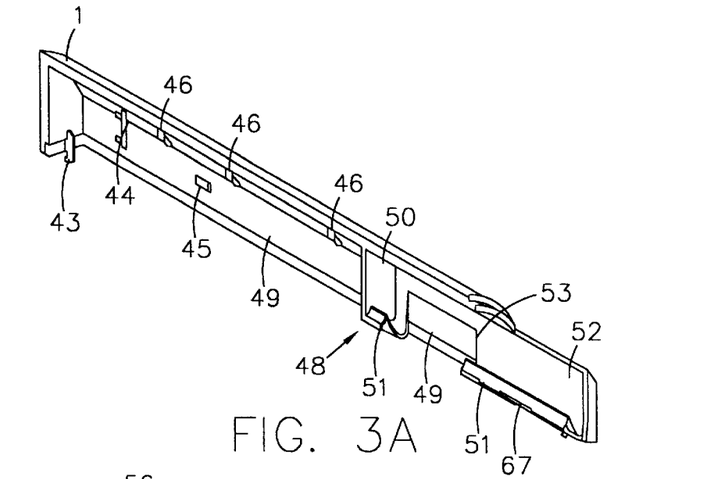
FIGS. 3a to 3h show a locking device with associated blocking device for a mobile telephone according to a second exemplary embodiment of the invention.
Figure 3B:
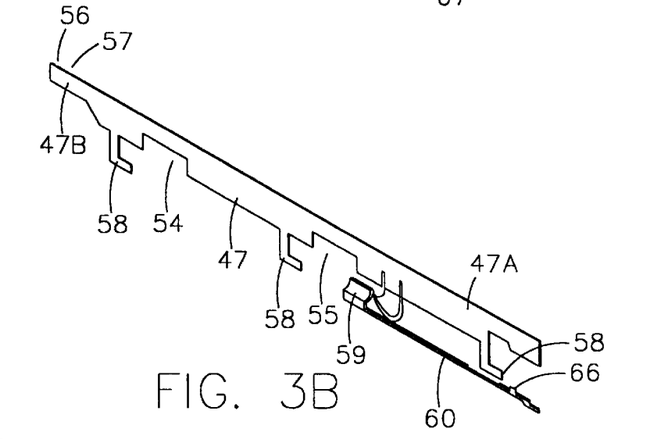

FIG. 3a shows the design of the rear housing shell 1 in the region of its side wall. On the rear end side, a positioning hook 43 is arranged pointing in the direction of the front housing shell 2. On the other hand, on the longitudinal inner side of the side wall there is a plurality of guide elements 44, 45 and 46 for guiding the locking rod 47, as is shown in FIG. 3b. In a lower section of the rear housing shell 1, a wall element 48, from which the battery receptacle region starts, projects inwards. This wall element 48 is at a distance from the side wall 49 of the rear housing shell 1, the locking rod 47 being guided between the wall element 48 and side wall 49. The wall element 48 has associated with it a transversely extending rear wall 50 and a base element 51, provided with curved portions, for receiving batteries. In addition, a side wall 52, which lies at a distance from and parallel to the side wall 49, is associated with the wall element 48. The side wall 52 contains an opening 53 which is rectangular here.

FIG. 3b shows the locking rod 47 which is constructed as a flat-section bar. It abuts the side wall 49 and is displaceable in its longitudinal direction. The already mentioned guide element 44, 45 and 46 serve to bear the locking rod 47 on the side wall 49, the guide elements 45 bearing the locking rod 47 from below, specifically in the region of recesses 54 and 55 on the lower longitudinal edge of the locking rod 47. The locking rod 47 abuts, with its upper longitudinal edge, the guide elements 46. The front section of the locking rod 47, designated by 47a, comes to rest between the walls 49 and 52.

A rear section 47b of the locking rod 47 has, on its upper longitudinal edge, two notches 56 and 57 which are at a distance from one another. This rear section 47b is secured against slipping off the side wall 49 by the bar-shaped guide element 44 which engages around the section 47b. Moreover, this bar-shaped guide element 44 has a latch extension which points from the top to the bottom and, depending on the displacement position of the locking rod 47 engages in one of the notches 56, 57 and thus blocks the locking rod 47. The bar-shaped guide element 44, the section 47b and the notches 56, 57 form a blocking device.

Hooks 58, which point in the direction of the front housing shell 2, are attached to the lower longitudinal edge of the locking rod 47. These hooks are composed of angular elements whose free leg runs parallel to the longitudinal direction of the locking rod 47. In the present case, the free leg points in the direction of the battery housing.

Moreover, in the front section 47a of the locking rod 47 there is also a lateral extension which has the reference symbol 59. This lateral extension 59 extends through the opening 53 into the battery compartment and forms part of the base of the battery compartment there. If there is a battery in the battery compartment, the battery rests both on the base element 51 and on the extension 59. For this purpose, both elements are structured in the same way. A third locking rod 60 which is connected to the free end of the extension 59 and runs parallel to the locking rod 47 serves to lock the housing shells 1 and 2 in the lower end-side region. The extension 59 is connected to the corresponding extension of the opposite locking rod, so that the third locking rod 60 lies in the centre.

Figure 3C:
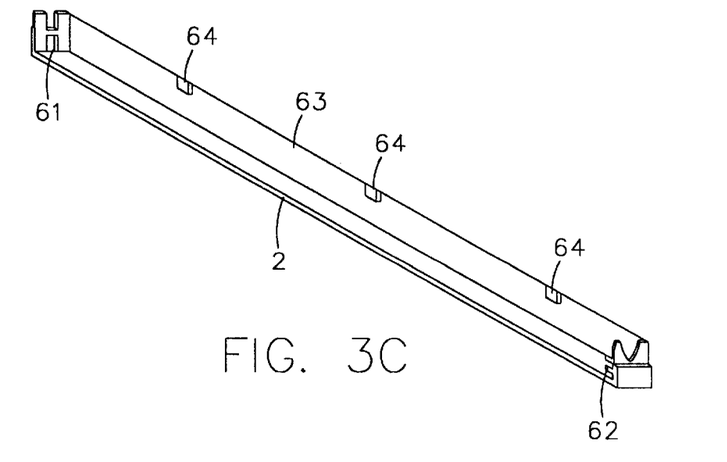

FIG. 3c shows the corresponding side wall of the front housing shell 2. Provided on its end side facing the antenna is a recess 61 for receiving the positioning hook 43. On the opposite end side there is a further recess 62 into which the free end of the further locking rod 60 can be inserted. Moreover, on the inner side of the side wall 63 of the front housing shell 2 there are a plurality of projections 64 which can be inserted into the hooks 58 when the locking rod 47 is correspondingly displaced.

Figures 3D, 3E, 3F:
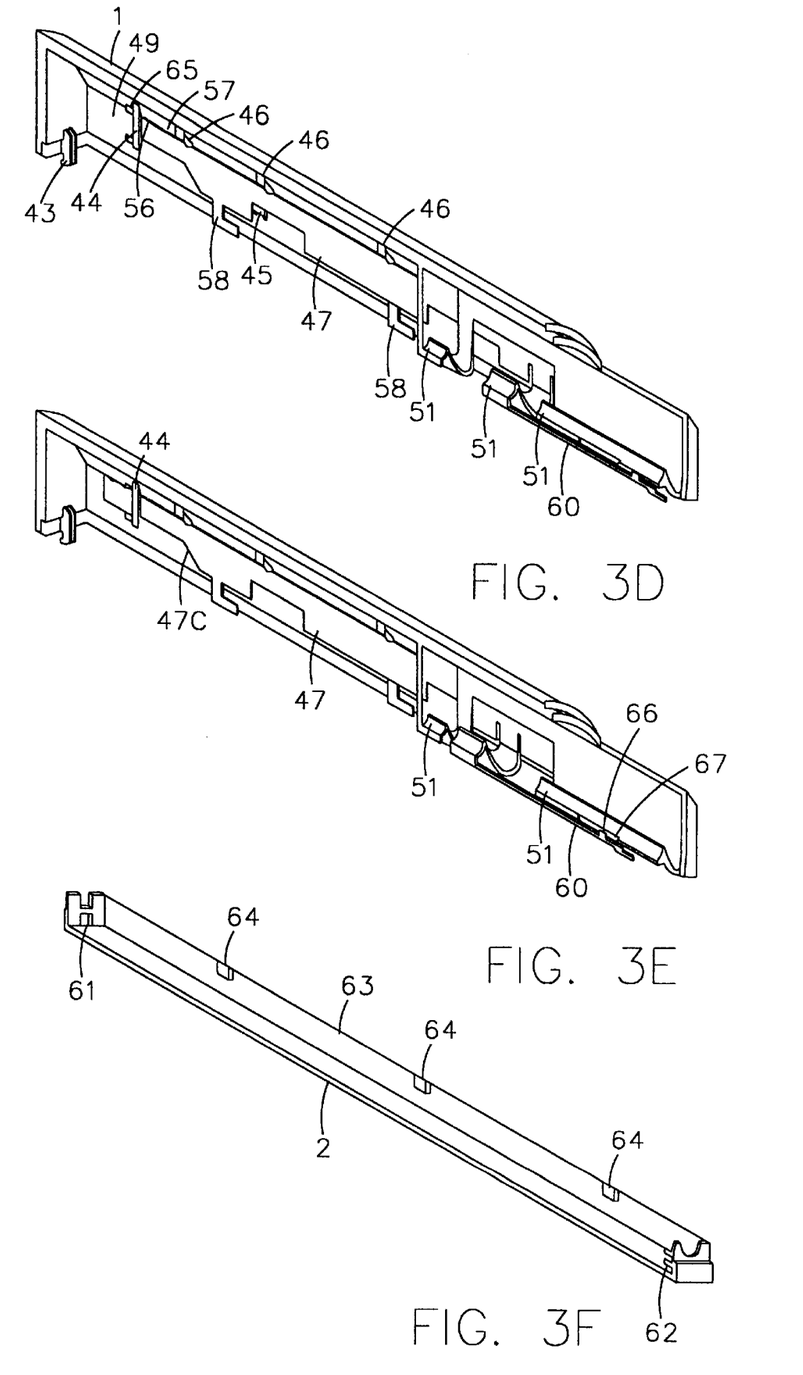

FIG. 3d shows a state of the rear housing shell 1 before final mounting of the locking rod 47. Here, the rear section 47b is not yet inserted into the bar-shaped guide element 44 which can be connected, for example, integrally, to the rear housing shell 1. It is possible to see the clamping device 65 which can latch into one of the notches 56 and 57 and which may also be of sprung construction. The clamping device 65 can be securely mounted on the bar 44. However, it can also be directly attached to the side wall 49.

On the other hand, FIG. 3e shows the rear housing shell 1 with the locking rod 47 in its completed, mounted position. Here, the clamping device 65 engages in the notch 57 so that displacement of the locking rod 47 in the direction of the battery compartment is also possible. Displacement of the locking rod 47 in the opposite direction can be prevented by means of an obliquely extending section 47c on its lower longitudinal edge, which section 47c no longer permits the locking rod 47 to pass rearwards through the bar-shaped guide element 44.

FIG. 3f shows once more the front housing shell 2.

Figure 3G:
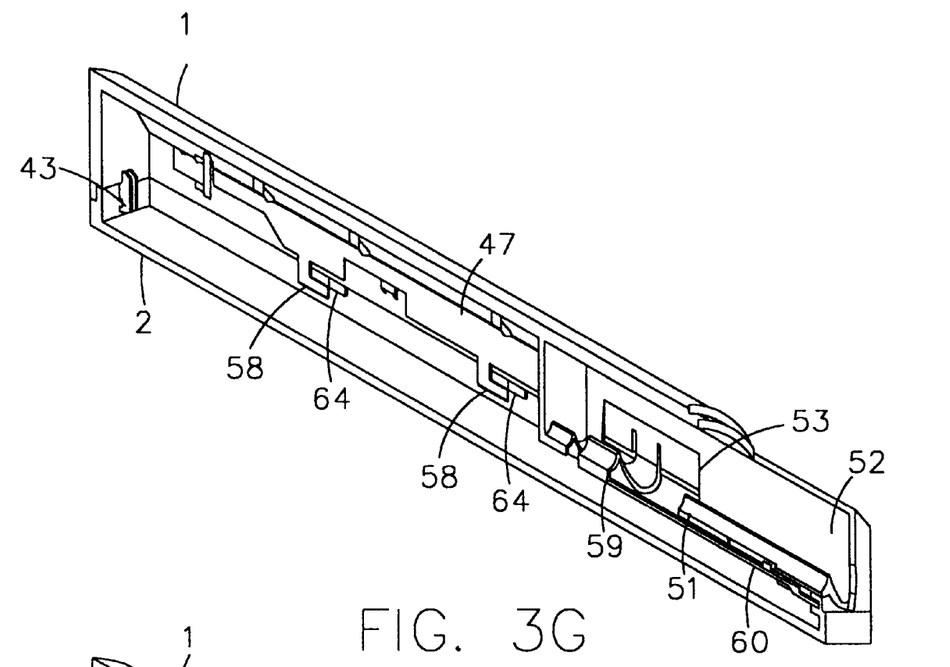
Figure 3H:
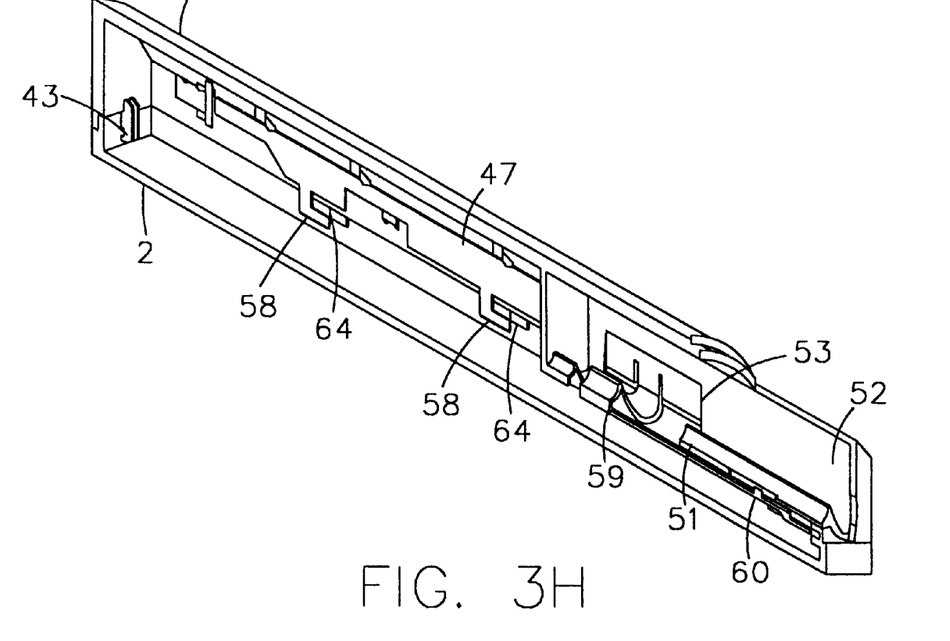

In FIG. 3g, the rear housing shell 1 and the front housing shell 2 are fitted one on the other, but are not yet locked to one another. Here, only the positioning hook 43 engages in the recess 61 of the front housing shell 2, so that the two housing shells 1 and 2 are thus positioned in relation to one another. If the locking rod 47 is now displaced in the direction of the battery compartment, the hooks 58 move over the projections 64 and thus lock both housing shells 1 and 2 to one another, also along the side wall of the handset. This state is shown in FIG. 3h. Simultaneously with this displacement of the locking rod 47, the front free end of the further locking rod 60 also moves into the recess 62 of the front housing shell 2, so that both housing shells 1 and 2 are also locked to one another in this end-side region of the handset.

The displacement of the two locking rods 47 is effected by operating a rearwardly protruding extension 66 on the third locking rod 60. For this purpose, the battery space cover (not illustrated) must initially be removed in order to obtain access to the interior of the battery compartment. After the batteries located in the said compartment, and a type plate which may be present and which could be attached to the base element 51 via a recess 67, which is located in the base element 51 and is intended for the extension 66 have been removed, the extension 66 can then be correspondingly displaced and with it the locking rods 47.

The expenditure of force for the displacement of the locking rods 47 out of the locking position into the unlocking position on the one hand and out of the unlocking position into the locking position on the other may be varied. This can be achieved in that the notches 56, 57 are given different depths. In order to make it as difficult as possible to get out of the locking position by displacing the locking rods 47, the depth of the notch 57 can be made larger, so that the clamping devices 65 engage more deeply into the respective locking rods 47 and therefore a larger displacement resistance has to be overcome when the locking rods 47 are displaced longitudinally.

I claim:

1. Handset for a radio telephone system, said handset having an interior defined by a front housing shell (2) and a rear housing shell (1) which can be connected thereto, said handset in said interior thereof has a locking device (22,23; 64, 58) which, in a locking position, locks the housing shells (1, 2) to one another and, in an unlocking position, releases the locking engagement of said housing shells, said handset also contains in said interior a blocking device (30, 32; 57, 65) which prevents the locking device from changing over automatically from the locking position into the unlocking position, wherein each of said housing shells has an outer wall and an opening is formed in one of said housing shells through the outer wall thereof and is located relative to said blocking device such that the blocking device can be actuated through said opening (15) located in an outer wall of one (1) of the housing shells (1, 2) and a removable outer wall element associated with said housing shell having the opening (15) closes off said opening.

2. Handset according to claim 1, characterized in that associated with the locking device are projections (22; 64) which are carried by one (2) of the housing shells (1, 2) and hooks (23; 58) which are carried by the other housing shell (2) and are displaceable parallel to a connection plane of the housing shells (1, 2).

3. Handset according to claim 2, characterized in that the relative displacement between the projections and hooks parallel to the connection plane of the housing shells can be blocked by means of the blocking device.

4. Handset according to claim 2, characterized in that the housing shells rest one on the other and each is displaceable parallel to the other, with both the projections (22) and the hooks (23) securely attached thereto.

5. Handset according to claim 4, characterized in that the blocking device contains at least one latch element which is carried by one of the housing shells (1) and engages behind one edge (32) of the other housing shell (2) when the locking device is in the locking position.

6. Handset according to claim 5, characterized in that the latch element is constructed as a latch arm (26, 27) which is pivotably mounted on the housing shell (1).

7. Handset according to claim 6, characterized in that the latch element (26, 27) is coupled to a tension element (36) which is located in the region of the opening (15).

8. Handset according to claim 7, characterized in that the free end of the tension element (36) is located in a guide means (35).

9. Handset according to claim 7, characterized in that the outer wall element (16) presses the latch element (26, 27) behind the edge (32) when the locking device is in the locking position.

10. Handset according to claim 9, characterized in that the outer wall element (16) can be displaced between two positions and covers the tension element (36) in each position.

11. Handset according to claim 2, characterized in that at least two locking rods (47) which each bear one of projections (64) or hooks (58), which rods being displaceable parallel to a connection plane of the housing shells (1, 2) and are mounted on one (1) of the housing shells, said other housing shell having the other of said hooks (58) or projections (64).

12. Handset according to claim 11, characterized in that a holder (44) is provided on one (1) of the housing shells and one end (47b) of the respective locking rods (47) is held so as to be displaceable in a clamping fashion in said holder (44).

13. Handset according to claim 12, characterized in that the locking rods (47) are each provided with an extension (59) which projects into a battery space.

14. Handset according to claim 13, characterized in that the extension (59) rests underneath batteries which are located in the battery space.

15. Handset according to claim 14, characterized in that a further locking rod (60) is provided for locking the housing shells (1, 2) and extends in the region of their end sides.

16. Handset according to one of claims 11, characterized in that the housing shells (1, 2) are pivotal with respect to one another about an end-side point (43, 61).

\* \* \* \* \*